United States Patent
Knaack

(10) Patent No.: US 9,279,343 B2
(45) Date of Patent: Mar. 8, 2016

(54) TURBOCHARGER SUPPORT HOUSING HAVING ALIGNMENT FEATURES

(75) Inventor: Russell Adam Knaack, Homer Glen, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 361 days.

(21) Appl. No.: 13/536,826

(22) Filed: Jun. 28, 2012

(65) Prior Publication Data

US 2014/0003932 A1    Jan. 2, 2014

(51) Int. Cl.
| | | |
|---|---|---|
| F01D 25/28 | (2006.01) | |
| F04D 29/40 | (2006.01) | |
| F01D 25/16 | (2006.01) | |
| F01D 25/24 | (2006.01) | |
| F02C 6/12 | (2006.01) | |
| F02C 7/06 | (2006.01) | |

(52) U.S. Cl.
CPC .............. *F01D 25/28* (2013.01); *F01D 25/162* (2013.01); *F01D 25/243* (2013.01); *F02C 6/12* (2013.01); *F02C 7/06* (2013.01); *F04D 29/403* (2013.01); *F05D 2230/64* (2013.01); *F05D 2240/40* (2013.01); *F05D 2260/30* (2013.01); *F05D 2260/40311* (2013.01)

(58) Field of Classification Search
CPC ....... F04D 29/42; F04D 29/403; F04D 25/18; F04D 25/24; F04D 25/28; F01D 25/28; F01D 25/243
USPC .............. 417/407, 423.4, 405, 406, 409, 390; 184/1.5, 6.2, 6.11, 6.12; 415/182.1, 415/110, 111, 75, 229
See application file for complete search history.

(56) References Cited

U.S. PATENT DOCUMENTS

| | | |
|---|---|---|
| 3,667,214 A | 6/1972 | Addie |
| 4,256,353 A | 3/1981 | Fischer et al. |
| 4,445,337 A | 5/1984 | McCreary |
| 4,719,818 A | 1/1988 | McCreary |

(Continued)

FOREIGN PATENT DOCUMENTS

| | | | |
|---|---|---|---|
| CA | 2561284 A1 | * | 3/2007 |
| GB | 263319 | | 12/1926 |

(Continued)

OTHER PUBLICATIONS

Support housing circa 2000, one page.

(Continued)

*Primary Examiner* — Charles Freay
*Assistant Examiner* — Kenneth J Hansen
(74) *Attorney, Agent, or Firm* — Finnegan, Henderson, Farabow, Garrett & Dunner, LLP

(57) ABSTRACT

A support housing for a turbocharger is provided. The support housing may include an end wall with a first side and a second side, and a protrusion extending from the first side of the end wall in a first direction and configured to receive the turbocharger. The support housing may also include a plurality of side walls extending from the second side of the end wall in a second direction opposite the first direction. The plurality of side walls together with the end wall may form a generally hollow enclosure. The support housing may also include a first mounting flange disposed at distal edges of the plurality of side walls and configured to engage an engine, and a first center opening disposed in the end wall and passing from the first side to the second side.

16 Claims, 5 Drawing Sheets

(56) References Cited

U.S. PATENT DOCUMENTS

| | | |
|---|---|---|
| 4,902,144 A | 2/1990 | Thoren |
| 5,014,741 A * | 5/1991 | Taguchi ................ 184/6.12 |
| 5,308,169 A | 5/1994 | Baker et al. |
| 5,993,173 A * | 11/1999 | Koike et al. ............. 417/407 |
| 6,139,261 A | 10/2000 | Bishop et al. |
| 6,499,884 B1 | 12/2002 | Svihla et al. |
| 6,896,479 B2 | 5/2005 | Svihla et al. |
| 7,128,529 B2 | 10/2006 | Le Jeune et al. |
| 7,189,005 B2 | 3/2007 | Ward |
| 2012/0285276 A1 | 11/2012 | Niimura |

FOREIGN PATENT DOCUMENTS

| | | |
|---|---|---|
| JP | 2000145468 A | 5/2000 |
| WO | 2011093432 | 8/2011 |

OTHER PUBLICATIONS

Partial view of support housing circa 2000, one page.

* cited by examiner

TURBOCHARGER SUPPORT HOUSING HAVING ALIGNMENT FEATURES

TECHNICAL FIELD

The present disclosure is directed to a turbocharger support housing and, more particularly, to a turbocharger support housing having alignment features.

BACKGROUND

Internal combustion engines such as, for example, diesel engines, gasoline engines, and gaseous fuel powered engines are supplied with a mixture of air and fuel for subsequent combustion within the engines that generates a mechanical power output. In order to increase the power generated by this combustion process, each engine can be equipped with a turbocharged air induction system.

A turbocharged air induction system includes a turbocharger that uses exhaust from the engine to compress air flowing into the engine, thereby forcing more air into a combustion chamber of the engine than could otherwise be drawn into the combustion chamber. This increased supply of air allows for increased fueling, resulting in an increased power output. A turbocharged engine typically produces more power than the same engine without turbocharging. An exemplary turbocharged engine is disclosed in U.S. Pat. No. 3,667,214 ("the '214 patent") of Addie that issued on Jun. 6, 1972.

A conventional turbocharger includes rotating parts such as turbine wheels located within a common support housing. Precise alignment is required between the support housing and the rotating shafts or wheels to prevent premature or excessive wear and damage of the components. If the support housing is misaligned relative to the rotating components, by even fractions of an inch, excessive friction and stress between the rotating parts can occur and lead to component failure. Conventional mechanisms for alignment utilize dowel pins, alignment gauges, and tedious assembly processes. However, these techniques require operators with extensive training, are time-intensive, and are subject to operator error.

The turbocharger support housing of the present disclosure solves one or more of the problems set forth above and/or other problems of the prior art.

SUMMARY

In one aspect, the disclosure is directed to a support housing for a turbocharger. The support housing may include an end wall with a first side and a second side, and a protrusion extending from the first side of the end wall in a first direction and configured to receive the turbocharger. The support housing may also include a plurality of side walls extending from the second side of the end wall in a second direction opposite the first direction. The plurality of side walls together with the end wall may form a generally hollow enclosure. The support housing may also include a first mounting flange disposed at distal edges of the plurality of side walls and configured to engage an engine, and a first center opening disposed in the end wall and passing from the first side to the second side. The support housing may also include a second mounting flange located at a periphery of the first center opening and extending from the second side of the end wall in the second direction, and a third mounting flange located at a periphery of the first center opening and extending from the first side of the end wall in the first direction. The support housing may also include a first annular pilot feature protruding from the third mounting flange around the first center opening.

In another aspect, the disclosure is directed to a support housing for a turbocharger. The support housing may include an end wall with a first side and a second side, and a protrusion extending from the first side of the end wall in a first direction and configured to receive the turbocharger. The support housing may also include a plurality of side walls extending from the second side of the end wall in a second direction opposite the first direction. The plurality of side walls together with the end wall may form a generally hollow enclosure. The support housing may also include a first mounting flange disposed at distal edges of the plurality of side walls and configured to engage an engine, and a first center opening disposed in the end wall and passing from the first side to the second side. The support housing may also include a second mounting flange located at a periphery of the first center opening and extending from the second side of the end wall in the second direction, and a third mounting flange located at a periphery of the first center opening and extending from the first side of the end wall in the first direction. The support housing may also include an annular pilot feature recessed within the first center opening at the second side.

DETAILED DESCRIPTION

Figure 1:
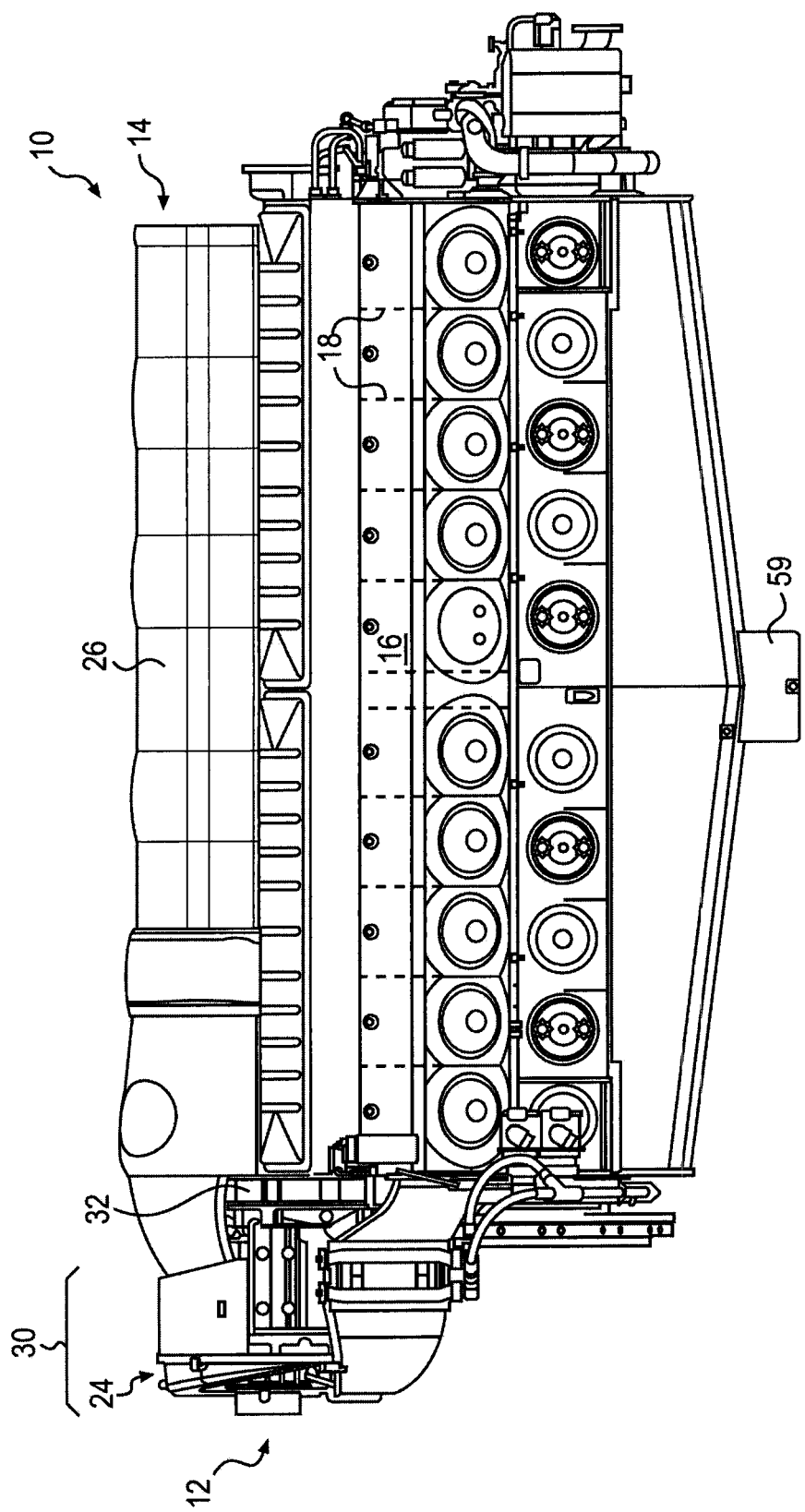
FIG. 1 is a pictorial illustration of an exemplary disclosed engine.

FIG. 1 illustrates an engine 10 equipped with an air induction system 12 and an exhaust system 14. For the purposes of this disclosure, engine 10 is depicted and described as a two-stroke diesel engine. One skilled in the art will recognize, however, that engine 10 may be another type of internal combustion engine such as, for example, a two- or four-stroke gasoline or gaseous fuel-powered engine. Engine 10 may include an engine block 16 that at least partially defines a plurality of cylinders 18. A piston (not shown) may be slidably disposed within each cylinder 18 to reciprocate between a top-dead-center position and a bottom-dead-center position, and a cylinder head (not shown) may be associated with each cylinder 18.

Cylinder 18, the piston, and the cylinder head may form a combustion chamber. In the illustrated embodiment, engine 10 includes twenty such combustion chambers arranged in two separate banks (only one shown in FIG. 1). However, it is contemplated that engine 10 may include a greater or lesser number of combustion chambers and that the combustion chambers may be disposed in an "in-line" configuration, in a "V" configuration, in an opposing-piston configuration, or in any other suitable configuration.

Air induction system 12 may include components configured to introduce charged air into the combustion chambers of engine 10. For example, air induction system 12 may include an induction manifold (not shown—located between the opposing banks of combustion chambers) fluidly connected along its length to the combustion chambers, one or more compressors 24 in fluid communication with an end of the induction manifold and, in some embodiments, an air cooler located downstream of compressors 24 and upstream of the combustion chambers. It is contemplated that additional components may be included within air induction system 12, if desired, such as valving, one or more air cleaners, one or more waste gates, a control system, a bypass circuit, and other means for introducing charged air into engine 10. It is also contemplated that the air cooler may be omitted, if desired.

Each compressor 24 of engine 10 may embody a fixed-geometry centrifugal-type compressor that is mechanically driven to compress air flowing into engine 10 to a predetermined pressure level. It should be noted that compressor 24 may be integrally connected to a turbine 28 that is driven by exhaust flow. Compressors 24, if more than one is included within air induction system 12, may be disposed in a series or parallel relationship and fluidly connected to engine 10 via the induction manifold.

Exhaust system 14 may be configured to recuperate energy from the exhaust flowing out of the combustion chambers of engine 10. For example, exhaust system 14 may include an exhaust manifold 26 fluidly connected along its length to the combustion chambers of engine 10, and one or more turbines 28 in fluid communication with an end of exhaust manifold 26. Turbines 28, if more than one is included within exhaust system 14, may be connected in a series or parallel relationship.

Each turbine 28 of exhaust system 14 may be mechanically connected to one or more compressors 24 of air induction system 12 to form a turbocharger 30. Turbocharger 30 may be mounted to engine 10 by way of a support housing 32. As the hot exhaust gases exiting engine 10 move through exhaust manifold 26 into turbine 28 and expand against blades thereof, turbine 28 may rotate and drive the connected compressors 24 to compress inlet air directed to the combustion chambers of engine 10 via the induction manifold.

Figure 2:
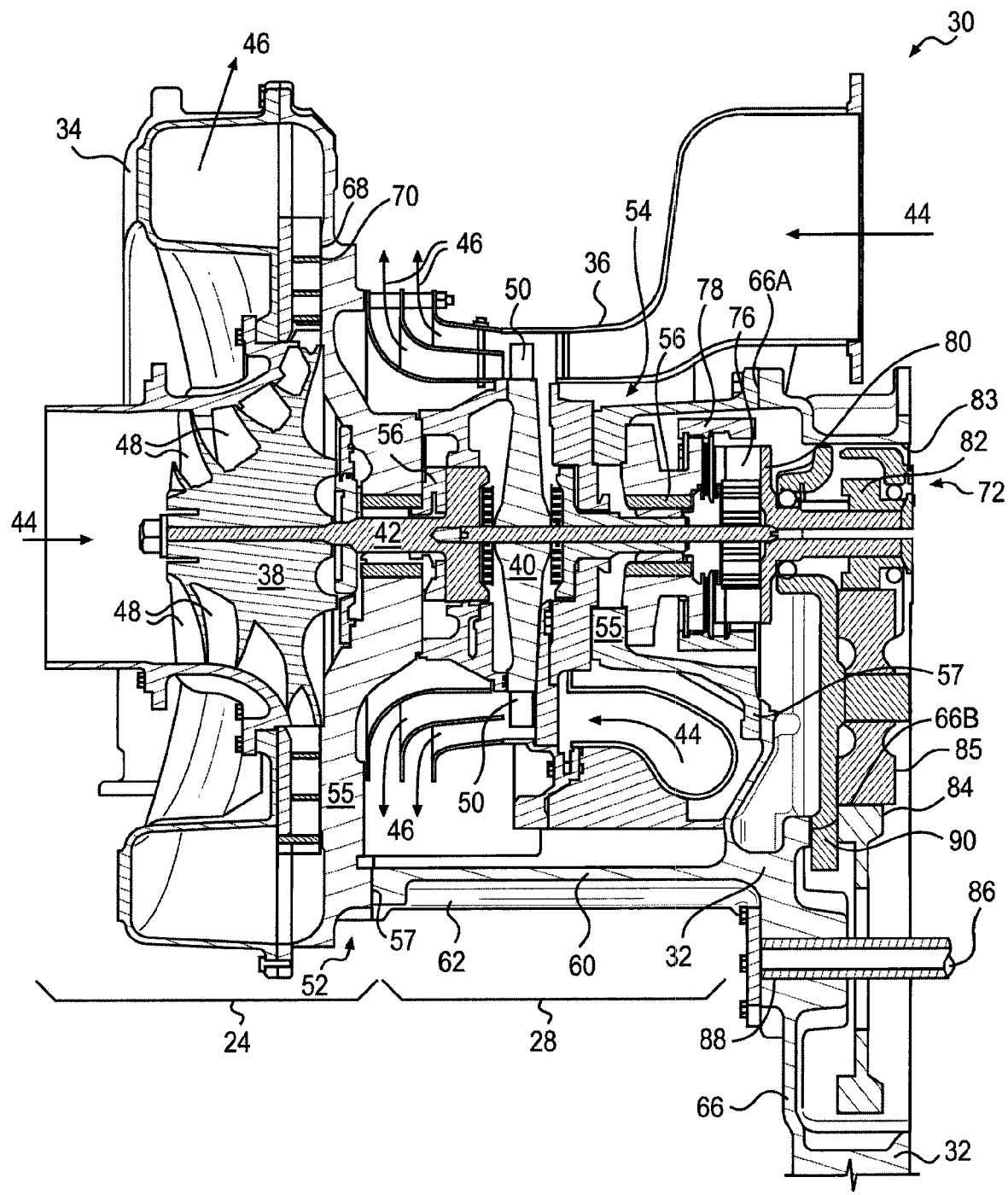
FIG. 2 is a cross-sectional illustration of an exemplary disclosed turbocharger that may be used in conjunction with the engine of FIG. 1.

As illustrated in FIG. 2, compressor 24 and turbine 28 may each include an associated shroud 34, 36 configured to house corresponding compressor and turbine wheels 38, 40 that are connected to each other via a common shaft 42. Each shroud 34, 36 may generally include an inlet 44 and an outlet 46. In the disclosed embodiment, inlets 44 are axially oriented and outlets 46 are radially oriented, although other configurations may also be possible. As compressor wheel 38 is rotated, air may be drawn axially in toward a center of compressor wheel 38. Blades 48 of compressor wheel 38 may then push the air radially outward in a spiraling fashion into the induction manifold (referring to FIG. 1). Similarly, as exhaust from exhaust manifold 26 is directed axially inward to turbine wheel 40, the exhaust may push against blades 50 of turbine wheel 40, causing turbine wheel 40 to rotate and drive compressor wheel 38 via shaft 42. After passing through turbine wheel 40, the exhaust may spiral radially outward through outlet 46 into the atmosphere. Compressor and turbine wheels 38, 40 may embody conventional wheels, with any number and configuration of blades 48, 50 radially disposed on a pressure face of corresponding wheel bases.

Each turbocharger 30 may include a bearing housing 52, 54 that connects compressor 24 and turbine 28 to support housing 32, respectively. Each of bearing housings 52, 54 may include a hollow, generally cylindrical body 55 having a mounting flange 57 located at one end that is configured to engage support housing 32. Cylindrical body 55 of bearing housings 52, 54 may be configured to support the corresponding compressor or turbine wheels 38, 40 at opposing ends of shaft 42 via one or more bearings 56.

Oil that lubricates bearings 56 may drain from bearing housings 52, 54 through support housing 32 to a sump 59 (shown only in FIG. 1) of engine 10. For example, the oil draining from bearing housing 52 may drain into one or more integral conduits 62 that pass through support housing 32 to sump 59 of engine 10. The oil draining from bearing housing 54 may flow through a generally horizontal end wall 66 of support housing 32 and drain to the sump of engine 10 via internal passages in engine block 16, as will be described in more detail below.

Bearing housing 52 may be a generally cylindrical, multi-stepped component configured to engage an axial end of support housing 32 (i.e., an end of a semi-cylindrical protrusion 60). Bearing housing 52 may be configured to internally support a compressor end of shaft 42 via bearings 56 at the compressor end, and support shroud 34 at an outer periphery. In fact, in the disclosed embodiment, bearing housing 52 cooperates with shroud 34 to form a scroll passage 68 that extends from inlet 44 to outlet 46. A diffuser 70 may be disposed within scroll passage 68.

Bearing housing 54 may also be a generally cylindrical, multi-stepped component. Bearing housing 54 may be configured to internally support shaft 42 via bearings 56 at the turbine end, and engage an exterior surface (or first side) 66A of end wall 66 at an outer periphery. Bearing housing 54 may also at least partially house and support a gear train 72. Gear train 72 may facilitate selective operation of turbocharger 30 in a turbocharging mode of operation (i.e., where turbine 28 drives compressor 24 in a conventional manner—described above) or in a supercharging mode of operation, where engine 10 drives compressor 24 via turbine 28. Supercharging may help eliminate lag normally associated with turbocharger operation at varying altitudes, thereby increasing both power and fuel efficiency.

Gear train 72 may be a planetary gear train. A planetary gear train is generally made up of at least three different elements, including a sun gear, a planet carrier having at least one set of planet gears, and a ring gear. The planet gears of the planet carrier mesh with the sun gear and the ring gear. One of the sun gear, planet carrier and ring gear is driven as an input, while another of the sun gear, planet carrier, and ring gear rotates as an output. The sun gear, planet carrier, planet gears, and ring gear can all rotate simultaneously to transmit power from the input to the output at a first ratio of speed-to-torque and in a forward direction or, alternatively, one of the sun gear, planet carrier, and ring gear can be selectively held stationary or locked to rotate with another gear and thereby transmit power from the input to the output at a second ratio of speed-to-torque and/or in a reverse direction. The change in rotational direction and/or speed-to-torque ratio of the planetary gear train depends upon the number of teeth in the sun and ring gears, the gear(s) that is selected as the input, the gear(s) that is selected as the output, and which gear, if any, is held stationary or rotationally locked with another gear. In some embodiments, a hydraulic clutch (also commonly referred to as a brake) is used to hold particular gears stationary and/or to lock the rotation of particular gears together.

In the disclosed embodiment, gear train 72 includes a sun gear 74 that is directly connected to an end of shaft 42 opposite compressor wheel 38, and a plurality of planet gears 76 that orbit and mesh with sun gear 74. Planet gears 76 may also mesh with a stationary ring gear 78 that is located radially outward of planet gears 76. A planet carrier 80 may extend from center axes of planet gears 76 and have formed on an external axle thereof a spur gear 82. Spur gear 82 may extend through a first center opening 83 in end wall 66 to drive an adjacent spur gear 84 (e.g., by way of one or more idler gears 85) that is rotatably supported on a shaft 86. Shaft 86 may extend through a second center opening 88 of support housing 32 to engage corresponding gears (not shown) within engine 10 that are connected to the crankshaft of engine 10. First and second center openings 83, 88 may pass through end wall 66 from exterior surface 66A to an interior surface (or second side) 66B. Second center opening 88 may be located at a position below first center opening 83. A bearing support 90 of gear train 72 may connect to end wall 66 of support housing 32 at interior surface 66B opposite bearing housing 54.

Figure 3:
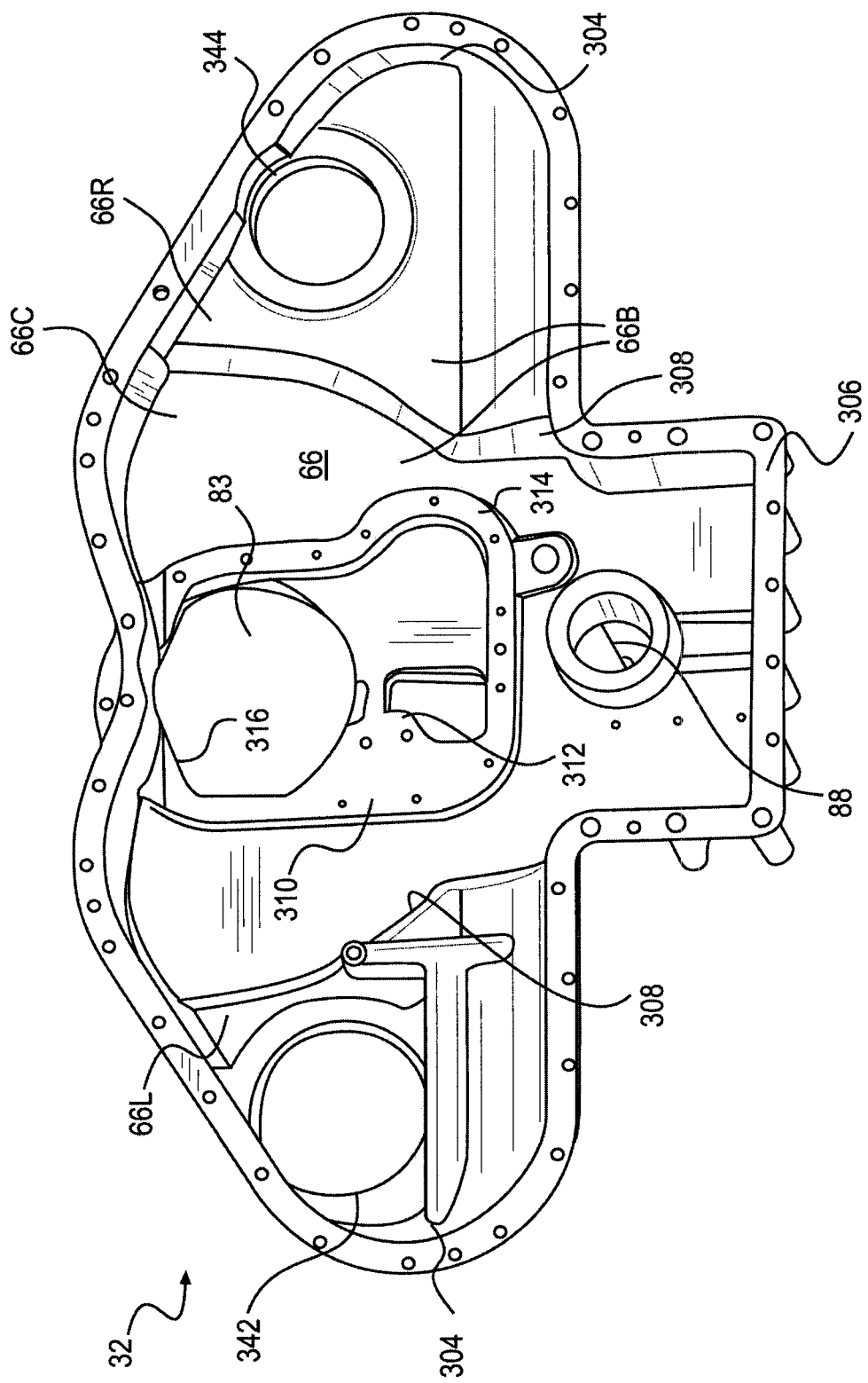
FIG. 3 is a pictorial illustration of an exemplary disclosed turbocharger support housing that may be used in conjunction with the turbocharger of FIG. 2.

As shown in FIG. 3, support housing 32 may be a cast component configured to provide a means of connecting the remaining components of turbocharger 30 to engine 10. In particular, support housing 32 may include end wall 66, semi-cylindrical protrusion 60 protruding from exterior surface 66A of end wall 66, and a plurality of side walls 304 that at least partially surround end wall 66 and protrude from interior surface 66B of end wall 66 in a direction opposite semi-cylindrical protrusion 60. Side walls 304, together with end wall 66, may form a generally hollow enclosure. A mounting flange 306 may be disposed at distal edges of side walls 304 in a generally parallel orientation relative to end wall 66. Mounting flange 306 may be configured to engage an end of engine block 16 (referring to FIG. 1). A plurality of fasteners (not shown) may pass through mounting flange 306 to connect support housing 32 with engine block 16.

End wall 66 of support housing 32 may be generally T-shaped, having a center portion 66C and left- and right-cross portions 66L, 66R, respectively. Support housing 32 may have a depth at center portion 66C that is greater than the depths of left- and right-cross portions 66L, 66R. Accordingly, a step 308 may separate each of left- and right-cross portions 66L, 66R from center portion 66C. Substantially all of center portion 66C may be generally parallel to mounting flange 306, while a gravitationally lower area (with respect to an upright assembled orientation) of left- and right-cross portions 66L, 66R may be sloped toward mounting flange 306 to facilitate draining of lubricating oil from these areas. A mounting flange 310 may protrude from center portion 66C to facilitate connection of bearing support 90 to support housing 32. One or more fasteners and/or dowel pins may pass through mounting flange 96 and be used to connect bearing support 90 to housing 32. Mounting flange 310 may have an irregular boundary and bulge out at one or more locations. For example, mounting flange 310 may include bulges 312 and 314 that are disposed below center opening 83. Mounting flange 310 may also include a plurality of protrusions 316 that extend over center opening 83 and are configured to provide structural support to support housing 32.

Center opening 88 may be disposed within a lower area of center portion 66C, below mounting flange 310. Center opening 88 may be generally circular and configured to receive shaft 86 (referring to FIG. 2). One or more additional openings (e.g., left and right openings 342, 344) may be disposed within left- and right-cross portions 66L, 66R. Left opening 342 may be configured to provide clearance for the shaft of an auxiliary component (e.g., an alternator, a pump, etc.—not shown) that is driven by engine 10. When the auxiliary component is not connected to support housing 32, left opening 342 may be closed off by way of a cover (not shown) that can be bolted to end wall 66. Right opening 344 may provide clearance and/or mounting for an oil separator (also known as a breather).

Figure 4:
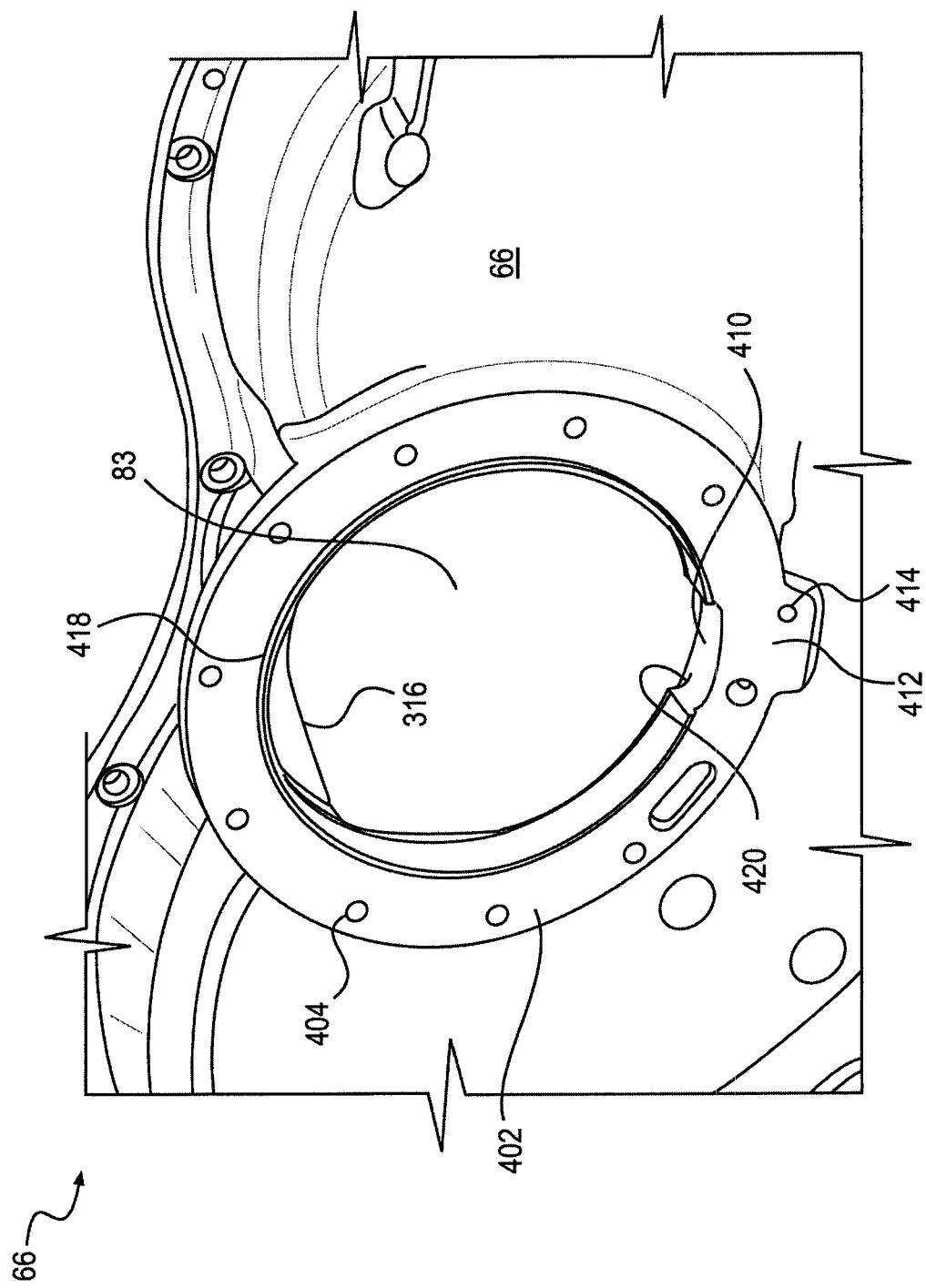
FIG. 4 is an enlarged pictorial illustration of a portion of the turbocharger support housing of FIG. 3.

As illustrated in FIG. 4, support housing 32 may have a mounting flange 402 that extends from exterior surface 66A at center opening 83 in a direction opposite mounting flange 310. A plurality of concentric mounting holes 404 may be disposed around a periphery of mounting flange 402. Each concentric mounting hole 404 may be configured to accept a fastening member such as a screw, dowel pin, or any other suitable fastening member to connect bearing housing 54 to support housing 32. Center opening 83 may include a recess 410 located at about a six o'clock position (or gravitationally lowest point after assembly to engine 10) that is configured to provide drainage for oil flowing around support housing 32 and bearing housing 54.

Mounting flange 402 may also include a lip 412. Lip 412 may be located at about a six o'clock position (or gravitationally lowest point after assembly to engine 10) and may include a pilot mounting hole 414. Pilot mounting hole 414 may be disposed farther from a geometric center of center opening 83 than concentric mounting holes 404. Pilot mounting hole 414 may serve as a pilot feature that helps to ensure proper alignment of mounting flange 402 and bearing housing 54. That is, the location of pilot mounting hole 414 may allow for only one proper orientation of bearing housing 54 with respect to mounting flange 302.

An annular pilot feature 418 may protrude from mounting flange 402 around center opening 83 of support housing 32. Annular pilot feature 418 may be a raised surface feature that is interrupted at recess 410. However, it is contemplated that pilot feature 418 may alternatively be continuous (i.e., completely annular), include a plurality of separated arcs, or have any other suitable configuration. Annular recess 420 may be disposed within interior surface 66B at an end of annular pilot feature 418. That is, annular recess 420 may be disposed around center opening 83, and be generally co-planar with recess 410.

Figure 5:
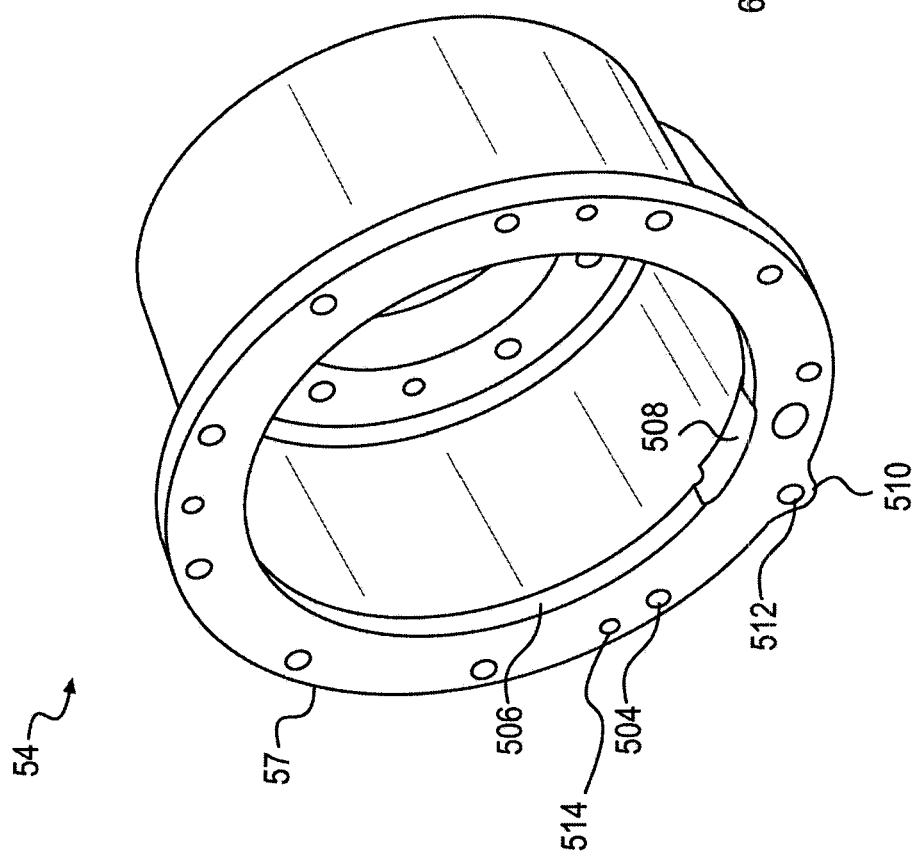
FIG. 5 is a pictorial illustration of an exemplary disclosed bearing housing that may be used in conjunction with the turbocharger support housing of FIG. 3.

As illustrated in FIG. 5 mounting flange 57 of bearing housing 54 may include a plurality of concentric mounting holes 504 disposed around the periphery of mounting flange 57 to align with concentric mounting holes 404 of mounting flange 402. Mounting flange 57 may have a bore 506 configured to surround and annularly engage pilot feature 418 to help ensure that bearing housing 54 and support housing 32 are radially aligned. Bore 506 may include a recess 508 located at about a six o'clock position (or gravitationally lowest point after assembly to engine 10) to align with recess 410 of mounting flange 402. Bore 506 may be interrupted at recess 508 and may have a substantially constant radius.

Bearing housing 54 may also include a lip 510 located at about a six o'clock position (or gravitationally lowest point after assembly to engine 10). Lip 510 may be configured to engage lip 412 of mounting flange 402 and include a pilot mounting hole 512 that aligns with pilot mounting hole 414. Pilot mounting hole 512 may be disposed farther from a geometric center of bore 506 than each concentric mounting hole 504. A plurality of threaded holes 514 may be disposed around a periphery of bearing housing 54.

Figure 6:
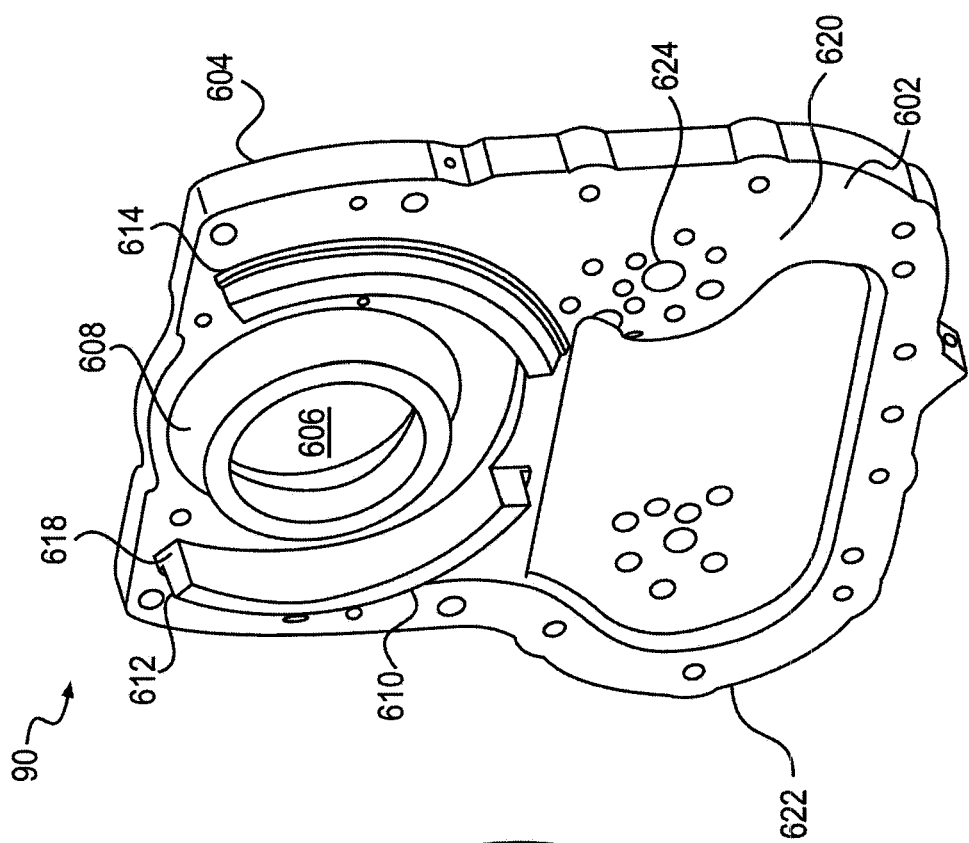
FIG. 6 is a pictorial illustration of an exemplary disclosed bearing support that may be used in conjunction with the turbocharger support housing of FIG. 3.

Bearing support 90 is illustrated in FIG. 6. Bearing support 90 may include an exterior surface 602 configured to engage mounting flange 310 of support housing 32, and an interior surface 604 located opposite of exterior surface 602. An opening 606 may extend from interior surface 604 toward exterior surface 602. The radius of opening 606 may decrease in the direction of exterior surface 602. A conical protrusion 608 may extend from exterior surface 602 and partially define opening 606.

Bearing support 90 may also include a plurality of pilot features 610. In one exemplary embodiment, pilot features 610 includes multiple arc segments (e.g., two arc segments) extending from exterior surface 602 to surround conical protrusion 608. Pilot feature 610 may have an outer radial surface 612 configured to engage annular recess 420 of support housing 32. Outer radial surface 612 may also include a stepped portion 614. Pilot feature 610 may also include an end surface 618 at a gravitationally highest position that is configured to engage protrusion 316 of support housing 32 and bulges 620 and 622 that engage bulges 312 and 314. Protrusion 620 may include a plurality of mounting holes 624 configured to receive the shaft of idler gear 85 (referring to FIG. 2). Axial alignment of bearing support 90 may be achieved by engaging exterior surface 602 with mounting flange 310.

Industrial Applicability

The disclosed turbocharger support housing may be implemented into any turbocharger and power system application where longevity of the support housing and associated rotating components is an issue. The disclosed turbocharger support housing may help reduce stress on the rotating components of the turbocharger by improving assembly alignment. The disclosed turbocharger support housing may also reduce assembly costs, and eliminate the need for dowel pins during alignment of support housing 32, bearing housing 54, and bearing support 90.

During assembly, mounting flange 57 of bearing housing 54 may be connected to mounting flange 402 of support housing 32 by aligning concentric mounting holes 504 with concentric mounting holes 404. Pilot mounting hole 512 may also be aligned with pilot mounting hole 414. The asymmetric arrangement of holes 414 and 512 may permit only one radial orientation of bearing housing 54 with respect to support housing 32. A plurality of bolts (not shown) may be extended through holes 404 and 504, and through pilot mounting holes 414 and 512, to secure bearing housing 54 to support housing 32. Bore 506 may engage and surround annular pilot feature 418 to ensure proper alignment of bearing housing 54 with respect to support housing 32. When support housing 32 and bearing housing 54 are connected, threaded holes 514 of bearing housing 54 may be disposed over a face of mounting flange 402 to facilitate separation of bearing housing 54 from support housing 32 during repair and disassembly. That is, a screw (not shown) may be inserted through threaded holes 514 to abut mounting flange 402. As additional force is applied to the screw, bearing housing 54 may separate from support housing 32.

Exterior surface 602 of bearing support 90 may be connected to mounting flange 310 of support housing 32. Additionally, pilot features 610 may be inserted into center opening 83 of support housing 32, so that outer radial surface 612 of pilot features 610 engages annular recess 420. Similarly, end surface 618 of bearing support 90 may engage protrusion 316 of support housing 32, respectively. The specific engagement of outer radial surface 612 with recess 420 and of end surface 618 with protrusion 316 may help ensure proper alignment of bearing support 90 with respect to support housing 32. Because bearing housing 54 and bearing support 90 may only be secured to support housing 32 in one angular orientation, proper angular alignment may be achieved and the useful life of support housing 32, bearing housing 54, bearing support 90, and associated rotating components can be extended.

It will be apparent to those skilled in the art that various modifications and variations can be made to the disclosed turbocharger support housing. Other embodiments will be apparent to those skilled in the art from consideration of the specification and practice of the disclosed turbocharger support housing. It is intended that the specification and examples be considered as exemplary only, with a true scope being indicated by the following claims and their equivalents.

What is claimed is:

1. A support housing for a turbocharger, comprising:
    an end wall with a first side and a second side;
    a protrusion extending from the first side of the end wall in a first direction and configured to receive the turbocharger;
    a plurality of side walls extending from the second side of the end wall in a second direction opposite the first direction, the plurality of side walls together with the end wall forming a generally hollow enclosure;
    a first mounting flange disposed at distal edges of the plurality of side walls and configured to engage an engine;
    a first center opening disposed in the end wall and passing from the first side to the second side;
    a second mounting flange located at a periphery of the first center opening and extending axially from the second side of the end wall in the second direction;
    a third mounting flange located at a periphery of the first center opening and extending from the first side of the end wall in the first direction; and
    an annular pilot feature including a raised surface protruding radially inward from the third mounting flange into the first center opening, and wherein an end of the annular pilot feature extends axially from the third mounting flange in the first direction around the first center opening.

2. The turbocharger support housing of claim 1, further including a recess disposed at a gravitationally lowest position within the first center opening.

3. The turbocharger support housing of claim 2, wherein the recess interrupts the annular pilot feature.

4. The turbocharger support housing of claim 1, further including a recess disposed at a gravitationally lowest position within the first center opening.

5. The turbocharger support housing of claim 1, further including a plurality of concentric mounting holes disposed within the third mounting flange.

6. The turbocharger support housing of claim 5, further including:
    a lip disposed at a gravitationally lowest position of the third mounting flange; and
    a pilot mounting hole disposed within the lip at a location farther away from a geometric center of the first center opening than the plurality of concentric mounting holes.

7. A support housing for a turbocharger, comprising:
    an end wall with a first side and a second side;
    a protrusion extending from the first side of the end wall in a first direction and configured to receive the turbocharger;
    a plurality of side walls extending from the second side of the end wall in a second direction opposite the first direction, the plurality of side walls together with the end wall forming a generally hollow enclosure;
    a first mounting flange disposed at distal edges of the plurality of side walls and configured to engage an engine;
    a first center opening disposed in the end wall and passing from the first side to the second side;

a second mounting flange located at a periphery of the first center opening and extending axially from the second side of the end wall in the second direction;

a third mounting flange located at a periphery of the first center opening and extending from the first side of the end wall in the first direction; and an annular pilot feature recessed within the first center opening at the second side; the annular pilot feature including a raised surface protruding radially inward from the third mounting flange into the first center opening, and wherein an end of the annular pilot feature extends axially from the third mounting flange in the first direction around the first center opening.

8. The turbocharger support housing of claim 7, further including a recess disposed at a gravitationally lowest position within the first center opening.

9. The turbocharger support housing of claim 8, wherein the annular pilot feature is interrupted at the recess.

10. The turbocharger support housing of claim 7, further including a plurality of concentric mounting holes disposed within the third mounting flange.

11. The turbocharger support housing of claim 10, further including:
a lip disposed at a gravitationally lowest position of the third mounting flange; and
a pilot mounting hole disposed within the lip at a location farther away from a geometric center of the first center opening than the plurality of concentric mounting holes.

12. The turbocharger support housing of claim 7, wherein the first mounting flange extends a greater distance from the end wall than the second mounting flange.

13. A turbocharger assembly, comprising:
a turbocharger having a turbine wheel, a compressor wheel, and a shaft connecting the turbine and compressor wheels;
a bearing housing supporting a turbine end of the shaft, a gear train driven by the shaft, and a bearing support supporting at least one end of the shaft; and
a support housing having:
an end wall with a first side and a second side;
a plurality of side walls extending from the end wall and together with the end wall forming a generally hollow enclosure;
a first mounting flange disposed at distal edges of the plurality of side walls and configured to engage an engine;
a first center opening disposed in the end wall and passing from the first side to the second side, the first center opening configured to receive the gear train;
a second mounting flange located at a periphery of the first center opening and extending from the second side of the end wall in a first direction, the second mounting flange configured to engage a bearing support;
a third mounting flange located at a periphery of the first center opening and extending from the first side of the end wall in a second direction, the third mounting flange configured to engage the bearing housing;
a first annular pilot feature disposed at the third mounting flange around the first center opening; and
a second annular pilot feature recessed within the first center opening at an axial end along a longitudinal axis of the support housing;
wherein each of the first and second annular pilot features is an arc segment which extends axially in the first direction away from the third mounting flange; and
wherein the first annular pilot feature is disposed at the third mounting flange around the first center opening at a location opposite the second annular pilot feature.

14. The turbocharger assembly of claim 13, further including a recess disposed at a gravitationally lowest position within the first center opening.

15. The turbocharger assembly claim 13, wherein:
the support housing includes a plurality of concentric mounting holes disposed within the third mounting flange; and
the bearing housing includes a plurality of concentric mounting holes configured to align with the plurality of concentric mounting holes of the support housing.

16. The turbocharger assembly of claim 13, wherein the first mounting flange extends a greater distance from the end wall than the second mounting flange.

* * * * *